O. L. SLATER.
Cotton Planters.

No. 142,355.  Patented September 2, 1873.

WITNESSES.
E. H. Bates
Geo. E. Alpham.

INVENTOR.
Oscar L. Slater,
Chipman Hosmer & Co.
Attys.

UNITED STATES PATENT OFFICE.

OSCAR L. SLATER, OF WALL HILL, MISSISSIPPI.

IMPROVEMENT IN COTTON-PLANTERS.

Specification forming part of Letters Patent No. 142,355, dated September 2, 1873; application filed August 2, 1873.

*To all whom it may concern:*

Be it known that I, OSCAR L. SLATER, of Wall Hill, in the county of Marshall and State of Mississippi, have invented a new and valuable Improvement in Cotton-Planters; and I do hereby declare that the following is a full, clear, and exact description of the construction and operation of the same, reference being had to the annexed drawings making a part of this specification, and to the letters and figures of reference marked thereon.

Figure 1:
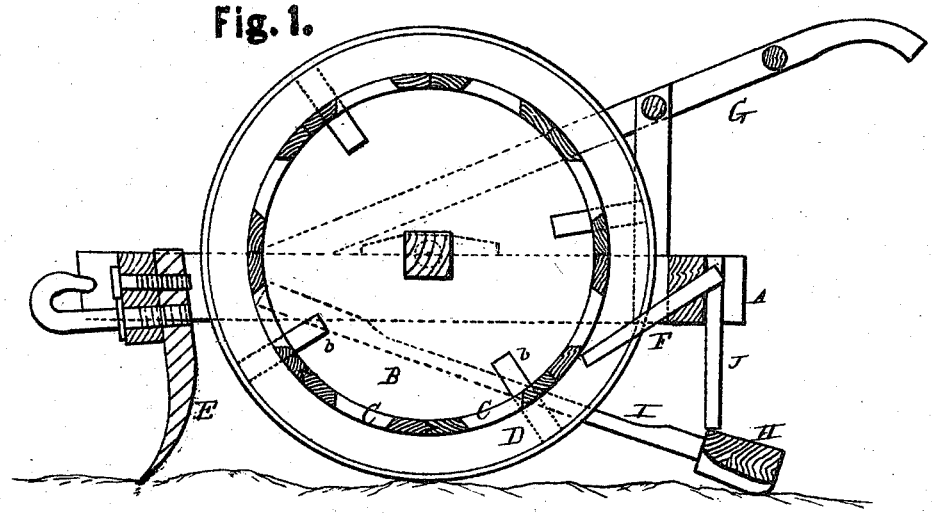
Figure 2:
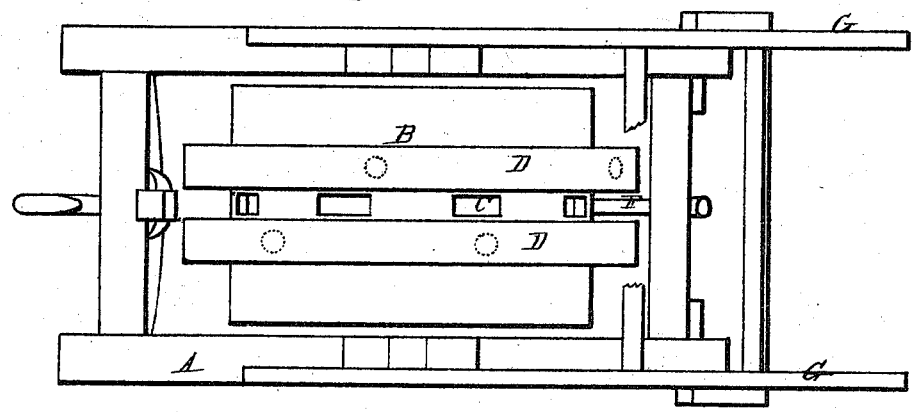

Figure 1 of the drawings is a representation of a sectional view of my invention. Fig. 2 is a plan view of the same.

This invention has relation to cotton-seed planters; and consists in the construction and novel arrangement of the parts of the seed-drum, substantially as hereinafter described.

Referring to the drawings, A designates the rectangular frame of a cotton-seed planter, between the sides of which is arranged the hollow rotary drum B, designed to contain and deposit seed placed therein through an opening in its periphery provided with a sliding door, and dropped through openings C. D designates flanges encircling said drum on either side of the row of openings C. These flanges are for the purpose of allowing the drum to roll on the ground, and are tired as wheels, and secured to said drum by means of radial pegs $b$, which project inside of the drum, and serve to separate the cotton-seeds, so that they may easily and in proper quantities pass through the openings C. E represents a tooth for opening the furrow preparatory to the reception of seed. F denotes a scraper projecting from the back of the frame A into the channel between the flanges D, and designed to keep said channel clear. G represents the handles, by means of which the implement is guided. H represents the coverer, consisting of a transverse bar having its under surface concave lengthwise and convex crosswise, so as to properly scrape up the earth and form the cotton-ridges. This bar is attached to the ends of two springs or elastic arms, I, which are secured to the sides of the frame, and which yield to allow the coverer to adapt itself to the irregularities of surface, and to pass over obstructions. In passing over obstructions the convex form of the under side of the bar prevents said bar from catching. J designates standards depending from the back part of the frame A. The object of these standards is to prevent the coverer from being raised too high in passing over the ground to do its work effectually.

It is apparent that, by my method of construction, the cost of manufacturing cotton-seed planters is materially lessened as compared with those in common use. An empty barrel may be made to serve as the seed-drum, and many farmers may be able to thus construct a planter that will serve a valuable purpose without the aid of regular manufacturers.

I am aware that rotating drums having interior spikes, and operated by gearing with the main wheel, are well-known devices. I do not, therefore, lay claim to the invention thereof; but

What I claim as new is—

In a cotton-planter, the seeding-barrel B, constructed of the staves, heads, and fellies D, the pegs $b$ projecting through the fellies into the barrel to form separating-teeth, and the tires serving to secure the said fellies, and to prevent the pegs from being forced out, all constructed and arranged substantially as specified.

In testimony that I claim the above I have hereunto subscribed my name in the presence of two witnesses.

OSCAR LITTLEBERRY SLATER.

Witnesses:
H. S. DANCY,
A. Q. WITHERS.